(12) United States Patent
Chen et al.

(10) Patent No.: US 12,284,585 B2
(45) Date of Patent: Apr. 22, 2025

(54) CYBER-PHYSICAL INTEGRATED RESTORATION METHOD AND SYSTEM FOR DISTRIBUTION SYSTEMS BASED ON EMERGENCY MOBILE COMMUNICATIONS

(71) Applicant: Xi'an Jiaotong University, Xi'an (CN)

(72) Inventors: Chen Chen, Xi'an (CN); Ruihuan Liu, Xiantao (CN); Zhigang Ye, Nanjing (CN); Fei Liu, Daqing (CN); Zhaohong Bie, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 354 days.

(21) Appl. No.: 17/972,198

(22) Filed: Oct. 24, 2022

(65) Prior Publication Data

US 2023/0130719 A1   Apr. 27, 2023

(30) Foreign Application Priority Data

Oct. 27, 2021   (CN) .......................... 202111258594.2

(51) Int. Cl.
*H04W 4/90* (2018.01)
*H04W 4/40* (2018.01)

(52) U.S. Cl.
CPC .............. *H04W 4/90* (2018.02); *H04W 4/40* (2018.02)

(58) Field of Classification Search
CPC ............ H04W 4/90; H04W 4/40; H04W 4/30
USPC ...................................................... 455/404.2
See application file for complete search history.

(56) References Cited

U.S. PATENT DOCUMENTS

| | | | |
|---|---|---|---|
| 9,094,794 B1 * | 7/2015 | White ..................... | H04W 4/30 |
| 10,793,106 B2 * | 10/2020 | Turley .................... | H04W 4/90 |
| 11,844,042 B2 * | 12/2023 | Anand ................... | G08G 1/202 |
| 2020/0265706 A1 * | 8/2020 | Smith ..................... | H04W 4/90 |

\* cited by examiner

*Primary Examiner* — Qutbuddin Ghulamali
(74) *Attorney, Agent, or Firm* — Hemisphere Law, PLLC; Zhigang Ma

(57) ABSTRACT

A cyber-physical integrated restoration method and system for distribution systems based on emergency mobile communications are provided. After extreme natural disasters which cause serious damage to distribution systems, damages of distribution systems are evaluated through system feedback data. When ground communication base stations are unavailable due to the damages, the method can make full use of existing wireless emergency communication resources to provide emergency communication services, and quickly restore the power supply through distribution automation functions with supports of the backup battery of automatic terminal devices, so as to effectively improve the resilience of distribution systems.

7 Claims, 2 Drawing Sheets

CYBER-PHYSICAL INTEGRATED RESTORATION METHOD AND SYSTEM FOR DISTRIBUTION SYSTEMS BASED ON EMERGENCY MOBILE COMMUNICATIONS

TECHNICAL FIELD

The disclosure relates to the technical field of distribution system resilience enhancement against extreme events, particular to a cyber-physical integrated restoration method and a system for the distribution system based on emergency mobile communications.

BACKGROUND

In the past decade, extreme events such as natural disasters and malicious attacks have occurred frequently worldwide, which have seriously affected safe operation of a power system. Large-scale and long-term power outages caused by disasters have caused huge losses to the national economy. With a frequent occurrence of the natural disasters caused by climate changes and increasing potential threats of man-made malicious attacks caused by a complex international situation, the importance of power system as a critical infrastructure and strategic facility has become increasingly prominent. It is of great significance to carry out the research on improving the resilience of power systems in the face of the extreme events.

A modern power system is a typical cyber-physical system. A main function of the cyber layer of power systems is to achieve situational awareness and information transmission of power systems, which determines the implementation of operation control decisions of the physical layer of power systems. When power systems operates normally, cyber-physical characteristics can ensure the safe and reliable operation of power systems. However, during extreme disasters, when there are faulted lines in the physical layer or information delay and interruption in the cyber layer, this cyber-physical deep interdependency will increase the vulnerability of power systems and further expand the impact of the disasters. In order to improve the resilience of power systems, it is necessary to tap flexible resources of cyber and physical layers to improve the resilience of power systems through resources coordination.

In the physical layer, existing researches have carried out deeply exploration on strengthening power system infrastructures and the using various flexible resources to improve the resilience of power systems. In the cyber layer, a large number of research foundations on a wireless emergency communication technology have been accumulated worldwide. The wireless emergency communication as a special strategy to deal with emergencies has prominent advantages in the case of sudden natural disasters which cause serious damage to communication infrastructure. Therefore, the wireless emergency communication technology plays an important role in the field of mobile communication. However, in the field of distribution system restoration after disasters, there are a few studies to restore a distribution automation function through the wireless emergency communication technology to speed restoration and many limitations in the research of cyber-physical power systems resilience enhancement strategy. It is necessary to study the impact of the wireless emergency communication technology on the post disaster restoration of the distribution system, and then explore the resilience enhancement strategy of the distribution system considering the cyber-physical characteristics.

SUMMARY

In order to solve above technical problems, the disclosure provides a cyber-physical integrated restoration method and a system for the distribution system based on emergency mobile communications. The disclosure uses an advanced emergency communication technology to increase situational awareness of the distribution system, and restores the situational awareness of the distribution system with the help of existing communication resources when some original communication devices are damaged or powered off. The disclosure provides a cooperative restoration method of coordination among the communication network restoration and the load restoration based on cyber-physical characteristics between the distribution automation communication network and the physical restoration, which effectively improves the resilience of the distribution system.

The disclosure provides the following technical solutions.

A cooperative cyber-physical distribution system restoration method based on emergency mobile communications, includes steps S1 to S6.

S1, Obtaining the data of damaged and faulted lines of the distribution system, and clarifying locations of line switches and locations of working sites for mobile emergency communication vehicles (also referred to as mobile communication vehicles).

S2, Modeling the optimal path for mobile emergency communication vehicles based on working site locations of mobile communication vehicles obtained by S1, and obtaining moving path constraints and moving time constraints of mobile communication vehicles. The mobile communication vehicle is represented by the communication agent (CA).

S3, Modeling repair crews dispatch to repair fault components based on the data of faulted lines obtained by S1, obtaining travel path constraints and travel time constraints of the dispatch model of repair crews, and using the repair agent (RA) to represent repair crews.

S4, Modeling the distribution system load restoration based on the topology of the distribution system and the positions of line switches obtained by S1, introducing a concept of an electric agent (EA) and establishing the relationship between a path optimization problem of the electric agent and the distribution system restoration problem through routing tables and arrival time vectors, obtaining electrical path constraints and electrical time constraints of the distribution system, and using electric agent to represent the energy flow path of the distribution system.

S5, Determining dependency relationships among repair crew scheduling, mobile communication vehicle scheduling and distribution system sequence restoration, based on path constraints and arrival time constraints built by the communication agent in S2, the repair agent in S3 and the electric agent in S4. Path constraints built by the communication agent in S2, the repair agent in S3 and the electric agent in S4 may include: moving path constraints, travel path constraints, and electrical path constraints. Arrival time constraints built by the communication agent in S2, the repair agent in S3 and the electric agent in S4 may include: moving time constraints, travel time constraints, and electrical time constraints. Dependency relationships among the repair crew scheduling, the mobile communication vehicle scheduling and the distribution system sequence restoration may include: interdependence constraints between the repair crew scheduling and the distribution system sequence restoration, and interdependence constraints between the mobile communication vehicle scheduling and the distribution system sequence restoration; and S6, Considering components and system operation constraints for the distribution system, regarding minimizing a total weighted unserved energy, a total repair time and a use time cost of mobile emergency communication vehicles as a goal, building the comprehensive optimization model of coordination between the distribution system restoration and the emergency mobile communication based on the variable time step method, according to path constraints and arrival time constraints built by the communication agent in S2, the repair agent in S3 and the electric agent in S4, dependency relationship constraints (i.e., interdependence constraints) between the repair crew scheduling and the distribution system sequence restoration in S5, dependency relationship constraints between the mobile communication vehicle scheduling and the distribution system sequence restoration in S5; and solving the comprehensive optimization model to obtain results of cooperative cyber-physical distribution system restoration, and restoring communication paths and loads of the distribution system after disasters based on the results.

In an embodiment, in S2, independent constraints of a routing table in the routing model of mobile communication vehicles are as follows:

$x_{ii}^C = 1, \forall i \in D^C;$ $x_{ii}^C = 0, \forall i \in W^C;$ $x_{ij}^C = 0, \forall i \in D^C \cup W^C, j \in D^C, i \neq j;$ $x_{ij}^C + x_{ji}^C \leq 1, \forall i,j \in D^C \cup W^C;$ $\Sigma_{j=1, j\neq i}^{n^{CA}} x_{ij}^C \leq n_{cap,i}^C, \forall i \in D^C;$ $\Sigma_{j=1}^{n^{CA}} x_{ij}^C \leq \Sigma_{h=1}^{n^{CA}} x_{hi}^C \leq 1, \forall i \in W^C;$ where $x_{ii}^C$, $x_{ij}^C$, $x_{ji}^C$ and $x_{hi}^C$ respectively represent elements in the routing table of mobile communication vehicles, $n^{CA}$ represents the number of working sites for mobile communication vehicles, $n_{cap,i}^C$ represents the number of mobile communication vehicles owned by the working site i, $D^C$ represents a gathering center of mobile communication vehicles, which is a starting point, and $W^C$ represents a set of working sites for mobile communication vehicles.

In an embodiment, in S2, independent constraints of moving time vectors in the routing model of mobile emergency communication vehicles are as follows:

$t_i^{Ca} = t_i^{Cd} = T_{ii}^C, \forall i \in D^C;$ $t_i^{Ca} \leq t_i^{Cd} \leq T^{MAX}, \forall i \in W^C;$ $\left.\begin{array}{l} t_j^{Ca} \geq t_i^{Cd} + T_{ij}^C - (1-x_{ij}^C)M \\ t_j^{Ca} \leq t_i^{Cd} + T_{ij}^C + (1-x_{ij}^C)M \end{array}\right\}, \forall i \in D^C \cup W^C, j \in W^C;$ $\left.\begin{array}{l} t_j^{Ca} \geq T^{MAX} - M\sum_{k=1,i\neq j}^{n^{CA}} x_{ij}^C \\ t_j^{Ca} \leq T^{MAX} + M\sum_{k=1,i\neq j}^{n^{CA}} x_{ij}^C \end{array}\right\}, \forall i \in W^C;$ $t_j^{Cd} \leq t_i^{Ca} + T_j^{Cmin} - \left(1 - \sum_{k=1,i\neq j}^{n^{CA}} x_{ij}^C\right)M, \forall j \in W^C;$ where $t_i^{Ca}$ and $t_i^{Cd}$ respectively represent the time for the communication agent to arrive the working site i and leave the working site i; $T_{ii}^C$ represents the start time for a path of mobile communication vehicles; $T^{MAX}$ represents a maximum moving time limit for mobile communication vehicles; $T_{ij}^C$ represents the time for the mobile communication vehicle to move from the working sites i to j; $x_{ij}^C$ represents the element in the routing table; M represents a constant; $T_j^{Cmin}$ represents the minimum time for the mobile communication vehicle to stay at the working site j; $D^C$ represents a gathering center of mobile communication vehicles; $W^C$ represents a set of working sites for mobile communication vehicles; $t_j^{Ca}$ and $t_j^{Cd}$ respectively represent the time for the communication agent to arrive the working site j and leave the working site j, and $n^{CA}$ represents the number of working sites for mobile communication vehicles.

In an embodiment, in S3, independent repair routing table constraints of repair crews (also referred to as travel path constraints) in the dispatch model of repair crews are as follows:

$x_{ii}^R = 1, \forall i \in D^R;$ $x_{ii}^R = 0, \forall i \in W^R;$ $x_{ij}^R = 0, \forall i \in D^R \cup W^R, j \in D^R, i \neq j;$ $x_{ij}^R + x_{ji}^R \leq 1, \forall i,j \in D^R \cup W^R;$ $\Sigma_{j=1, j\neq i}^{n^{RA}} x_{ij}^R \leq n_{cap,i}^R, \forall i \in D^R;$ $\Sigma_{j=1}^{n^{RA}} x_{ij}^R \leq \Sigma_{h=1}^{n^{RA}} x_{hi}^R \leq 1, \forall i \in W^R;$ where $x_{ii}^R$, $x_{ij}^R$, $x_{ji}^R$ and $x_{hi}^R$ respectively represent elements in the repair routing table of repair crews, $n_{cap,i}^R$ represents the number of repair crews owned by a depot i, $D^R$ represents a set of depots, $W^R$ represents a repair site set, and $n^{RA}$ represents the number of fault points and depots.

In an embodiment, in S3, independent constraints of travel time (also referred to as travel time constraints) in the dispatch model of repair crews are as follows:

$t_i^R = T_{ii}^R, \forall i \in D^R;$ $\left.\begin{array}{l} t_j^R \geq t_i^R + T_{ij}^R + T_i^{RP} + T_i^{MS} - (1-x_{ij}^R)M \\ t_j^R \leq t_i^R + T_{ij}^R + T_i^{RP} + T_i^{MS} + (1-x_{ij}^R)M \end{array}\right\}, \forall i \in SW \cap FR, \forall j \in W^R, i \neq j;$ $\left.\begin{array}{l} t_j^R \geq t_i^R + T_{ij}^R + T_i^{RP} - (1-x_{ij}^R)M \\ t_j^R \leq t_i^R + T_{ij}^R + T_i^{RP} + (1-x_{ij}^R)M \end{array}\right\}, \forall i \in FR\backslash SW, \forall j \in W^R, i \neq j;$ $\left.\begin{array}{l} t_j^R \geq T^{MAX} - M\sum_{k=1,i\neq j}^{n^{RA}} x_{ij}^R \\ t_j^R \leq T^{MAX} + M\sum_{k=1,i\neq j}^{n^{RA}} x_{ij}^R \end{array}\right\}, \forall j \in W^R;$ $f_{r^e(f)}^R \geq t_f^R + T_f^{RP}, \forall f \in FR\backslash SW;$ $f_i^R = T_{ii}^R, \forall f \in FR\backslash SW, i \neq r^e(f);$ where $t_i^R$, $t_j^R$ and $t_f^R$ respectively represent the time for repair crews to arrive fault components i, j and f; $T_{ii}^R$ represents the start time for repair crews from the depot; $T_{ij}^R$ represents the time for repair crews to move from components i to j; $x_{ij}^R$ represents the element in the repair routing table of repair crews; $T_i^{RP}$ represents the time for repair crews to repair the fault component i; $T_i^{MS}$ represents the time for repair crews to manually operate a fault line switch; M represents a constant; $T^{MAX}$ represents a maximum travel time limit for repair crews; $n^{RA}$ represents the sum of the number of fault points and depots; $T_f^{RR}$ represents the time for repair crews to repair the fault component f, $f_{r^e(f)}^R$ represents the repair completion time of a node cell with faulted lines inside of it; $f_i^R$ represents the completion time for fault components in a node cell i to be repaired; $D^R$ represents the set of depots; $W^R$ represents a repair site set of repair crews; FR represents a set of fault components; $r^e(f)$ represents an index conversion of the fault component i from RA to EA, which represents the node cell in which the fault f is inside; and SW represents a set of line switches.

In an embodiment, in S4, independent constraints of the electrical routing table (also referred to as electrical path constraints) in the distribution system restoration model are as follows:

$$x_{ii}^E = 1, \forall i \in g^E;$$

$$x_{ii}^E = 0, \forall i \in C^E \backslash g^E;$$

$$x_{ij}^E = 0, \forall i \in C^E, j \in g^E, i \neq j;$$

$$x_{ij}^E = x_{ji}^E = 0, \forall (i,j) \notin SW;$$

$$x_{ij}^E + x_{ji}^E \leq 1, \forall (i,j) \in SW;$$

$$\Sigma_{h=1}^{n^{EA}} x_{hi}^E \leq 1, \forall i \in C^E;$$

$$\Sigma_{j=1}^{n^{EA}} x_{ij}^E \leq n^{EA} \Sigma_{h=1}^{n^{EA}} x_{hi}^E, \forall i \in C^E;$$

where $x_{ii}^E$, $x_{ij}^E$ and $x_{ij}^E$ respectively represent elements in the electrical routing table; $n^{EA}$ represents the number of node cells of the distribution system; $C^E$ represents a set of node cells; $g^E$ represents a set of node cells in which a black start generator or a substation is inside; SW represents a set of the line switches; and $x_{hi}^E$ represents an energy flow path from the node cell h to the node cell i.

In an embodiment, in S4, independent constraints of electrical time (also referred to as electrical time constraints) in the restoration model of the distribution system are as follows:

$$t_i^E = T_{ii}^E, \forall i \in g^E;$$

$$\left. \begin{array}{l} t_j^E \geq T^{MAX} - M \sum_{k=1, i \neq j}^{n^{EA}} x_{ij}^E \\ t_j^E \leq T^{MAX} + M \sum_{k=1, i \neq j}^{n^{EA}} x_{ij}^E \end{array} \right\}, \forall i \in C^E \backslash g^E;$$

where $t_i^E$ represents the time for a node cell i to be energized, $T_{ii}^E$ represents the starting time for a source node to be energized, $t_j^E$ represents the time for a node cell j to be energized, $T^{MAX}$ represents a maximum travel time limit for repair crews, $x_{ij}^E$ represents a binary variable to indicate if branch (i,j) is energized, when $x_{ij}^E = 1$, it represents a path i to j is energized from node cells i to j, M represents a constant, $C^E$ represents a set of node cells of the distribution system, $g^E$ represents a set of node cells in which a black start generator or a substation is inside, $n^{EA}$ represents a number of node cells of the distribution system.

In an embodiment, in S5, interdependent constraints between the mobile communication vehicle scheduling and the distribution system sequence restoration are as follows:

$$x_{ij}^E = d_{ij}^{AO} + d_{ij}^{MO}, \forall (i,j) \in SW;$$

$$d_{ij}^{AO} \leq \Sigma_{h=1, h \neq k}^{CA} x_{hk}^C k \in W_{(i,j)}^C;$$

$$t_j^E \geq t_k^{Ca} - (2 - d_{ij}^{AO} - \Sigma_{h=1, h \neq k}^{CA} x_{hk}^C) M, \forall k \in W_{(i,j)}^C;$$

$$t_j^E \leq t_k^{Cd} - (2 - d_{ij}^{AO} - \Sigma_{h=1, h \neq k}^{CA} x_{hk}^C) M, \forall k \in W_{(i,j)}^C;$$

$$t_k^{Cd} \geq \max(t_i^E, f_j^R) + T_{(i,j)}^{AS} - (2 - d_{ij}^{AO} - \Sigma_{h=1, h \neq k}^{CA} x_{hk}^C) M,$$
$$\forall k \in W_{(i,j)}^C;$$

$$t_j^E \geq \max(t_i^E, f_j^R) + T_{(i,j)}^{AS} - (1 - d_{ij}^{AO}) M;$$

$$\max(t_j^E, f_j^R) \leq RT_{(i,j)} + (1 - d_{ij}^{AO}) M;$$

where $x_{ij}^E$ represents a binary variable to indicate if branch (i,j) is energized, $d_{ij}^{AO}$ and $d_{ij}^{MO}$ are binary variables indicating if the switch (i,j) is automatically/manually operated from i to j, $d_{ji}^{AO}$ is a binary variable, $x_{hk}^C$ represents the element in the routing table, $n^{CA}$ represents the number of working sites for mobile communication vehicles, $t_j^E$ represents the time for a node cell j to be energized, $t_k^{Ca}$ and $t_k^{Cd}$ respectively represent the time for the communication agent to arrive the working site k and leave the working site k, M represents a constant, $t_i^E$ represents the time for a node cell i to be energized, $f_j^R$ represents the time for fault components in the node cell j to be repaired, $T_{(i,j)}^{AS}$ represents operation time of an automatic switch, $RT_{(i,j)}$ represents the residual time of the backup battery of a feeder terminal unit (FTU) on a line (i,j), SW represents a set of line switches, $W_{(i,j)}^C$ represents a line set of a FTU corresponding to the working site, and $f_i^R$ represents the time for fault components in the node cell i to be repaired;

interdependent constraints between the repair crew scheduling and the distribution system sequence restoration are as follows:

$$d_{ij}^{MO} + d_{ji}^{MO} = \sum_{h=1, h \neq k}^{n^{RA}} x_{hk}^R, \forall (i,j) \in SW, k = e^r(i,j);$$

$$\left. \begin{array}{l} d_{ij}^{MOe} + d_{ij}^{MOde} \geq 1 - (1 - d_{ij}^{MO}) M \\ d_{ij}^{MOe} + d_{ij}^{MOde} \leq 1 + (1 - d_{ij}^{MO}) M \end{array} \right\}, \forall (1,j) \in SW;$$

$$\frac{t_{e^r(i,j)}^R - t_i^E}{M} \leq d_{ij}^{MOe} \leq \frac{t_{e^r(i,j)}^R - t_i^E}{M} + 1, \forall (i,j) \in SW;$$

$$\left. \begin{array}{l} t_j^E \geq t_{e^r(i,j)}^R + T_{(i,j)}^{MS} - (2 - d_{ij}^{MO} - d_{ij}^{MOe}) M \\ t_j^E \leq t_{e^r(i,j)}^R + T_{(i,j)}^{MS} + (2 - d_{ij}^{MO} - d_{ij}^{MOe}) M \end{array} \right\}, \forall (i,j) \in \frac{SW}{F};$$

$$\left. \begin{array}{l} t_j^E \geq t_{e^r(i,j)}^R + T_{(i,j)}^{MS} + T_{(i,j)}^{RP} - (2 - d_{ij}^{MO} - d_{ij}^{MOe}) M \\ t_j^E \leq t_{e^r(i,j)}^R + T_{(i,j)}^{MS} + T_{(i,j)}^{RP} + (2 - d_{ij}^{MO} - d_{ij}^{MOe}) M \end{array} \right\}, \forall (i,j) \in SW \cap F;$$

$$\frac{t_i^E - (t_{e^r(i,j)}^R + T_{(i,j)}^{MS})}{M} \leq d_{ij}^{MOde} \leq \frac{t_i^E - (t_{e^r(i,j)}^R + T_{(i,j)}^{MS})}{M} + 1, \forall (i,j) \in SW \backslash F;$$

$$\frac{t_i^E - (t_{e^r(i,j)}^R + T_{(i,j)}^{RP} + T_{(i,j)}^{MS})}{M} \leq d_{ij}^{MOde} \leq \frac{t_i^E - (t_{e^r(i,j)}^R + T_{(i,j)}^{RP} + T_{(i,j)}^{MS})}{M} + 1,$$
$$\forall (i,j) \in SW \cap F;$$

$$\left. \begin{array}{l} t_j^E \geq t_i^E - (2 - d_{ij}^{MO} - d_{ij}^{MOde}) M \\ t_j^E \leq t_i^E + (2 - d_{ij}^{MO} - d_{ij}^{MOde}) M \end{array} \right\}, \forall (i,j) \in SW;$$

-continued $$\left.\begin{array}{l} t_i^E \geq t_{e^r(i,j)}^R + T_{(i,j)}^{RP} \\ t_j^E \geq t_{e^r(i,j)}^R + T_{(i,j)}^{RP} \end{array}\right\}, \forall\, (i,j) \in SW \cap F;$$

$$t_i^E \geq f_i^R, \forall\, i \in C^E;$$

where $d_{ij}^{MO_e}$ and $d_{ij}^{MO_{de}}$ respectively represent the repair crew manually operating the line switch with electricity and without electricity; $x_{hk}^R$ represents the element in the repair routing table; $n^{RA}$ represents the sum of the number of fault points and depots; $d_{ji}^{MO}$ is a binary variable indicating if the switch (i,j) is manually operated; $e^r(i,j)$ represents an index conversion of the line switch (i,j) from the electric agent to the repair agent; $t_{e^r(ii)}^R$ represents the time for repair crews to arrive the fault point, $t_i^E$ represents the time for the node cell i to be energized; $T_{(i,j)}^{MS}$ represents the operation time of a manual switch; $T_{(i,j)}^{RP}$ represents the time for repair crews to repair a faulted line (i,j), F represents a set of faulted lines, and $C^E$ represents a set of node cells in the distribution system.

In an embodiment, an objective function of the comprehensive optimization model is as follows:

$$\min Obj = \beta^E Obj^E + \beta^R Obj^R + \beta^C Obj^C;$$

$$Obj^E = \Sigma_{c \in C^E} w_c^E t_c^E \Sigma_{l \in L_c} \Sigma_{\emptyset \in \Phi} P_{l,\emptyset}^L;$$

$$Obj^R = w_1^R \Sigma_{i=1}^{n^{RA}} \Sigma_{j=1, j \neq i}^{n^{RA}} x_{ij}^R T_{ij}^R + w_2^R \Sigma_{i=1}^{n^{EA}} f_i^R;$$

$$Obj^C = w_1^C \Sigma_{i=1}^{n^{CA}} \Sigma_{j=1, j \neq i}^{n^{CA}} x_{ij}^C T_{ij}^C + w_2^C \Sigma_{i \in W^C} (t_i^{Cd} - t_i^{Ca});$$

where $Obj^E$, $Obj^R$ and $Obj^C$ are three sub objective functions, which respectively represent the total weighted unserved energy, the total repair time, deployment and use time (i.e., the use time cost) of mobile communication vehicles; $\beta^E$, $\beta^R$ and $\beta^C$ are coefficients in front of three sub objective functions respectively; $w_c^E$ represents the weight value of a node cell c, $t_c^E$ represents the time for a node cell c to be energized; $P_{l,\emptyset}^L$ represents a load at a node cell l; $L_c$ represents the set of loads in node cell c; $\Phi = \{a, b, c\}$ represents power three-phase; $w_1^R$ and $w_2^R$ respectively represent the weight of the total travel time of all RAs and the total repair completion time of all the node cells, $n^{RA}$ represents the number of fault points and depots; $x_{ij}^R$ represents the element of the repair routing table; $T_{ij}^R$ represents the time for repair crews to move between two fault components; $n^{EA}$ represents the number of node cells in the distribution system; $f_i^R$ represents the time for fault components in the node cell i to be repaired; $w_1^C$ and $w_2^C$ respectively represent the weight of the total travel time of all CAs and the total duration of stay of CAs at all working sites; $n^{CA}$ represents the number of working sites for mobile communication vehicles; $x_{ij}^C$ represents the element in the routing table of mobile communication vehicles; $T_{ij}^C$ represents the time for mobile communication vehicle to move from working sites i to j; $W^C$ represents a set of working sites for mobile communication vehicles; and $t_i^{Ca}$ and $t_i^{Cd}$ respectively represent the time for the communication agent to arrive the working site i and leave the working site i.

Another technical solution of the disclosure is a cooperative cyber-physical distribution system restoration system based on emergency mobile communications, including:

a data module, configured to obtain the data of damaged and faulted lines of the distribution system, and clarify locations of line switches and locations of working sites for mobile communication vehicles;

a communication agent module, configured to model the optimal path for the mobile communication vehicles based on working site locations of mobile communication vehicles obtained by the data module, and obtain moving path constraints and moving time constraints of mobile communication vehicles, which are represented by the communication agent;

a repair agent module, configured to model the repair crews dispatch to repair fault components based on the data of faulted lines obtained by the data module, and obtain travel path constraints and travel time constraints of a dispatch model of repair crews, which are represented by the repair agent;

an electric agent module, configured to model the distribution system load restoration based on the topology of the distribution system and positions of line switches obtained by the data module, introduce a concept of an electric agent and establish the relationship between a path optimization problem of the electric agent and the distribution system restoration problem through routing tables and arrival time vectors, obtain electrical path constraints and electrical time constraints of the distribution system, and the energy flow path of the distribution system being represented by the electric agent;

an interdependency relationship module, configured to determine dependency relationships among repair crew scheduling, mobile communication vehicle scheduling and distribution system sequence restoration, based on routing table constraints and arrival time constraints built by the communication agent, the repair agent and the electric agent; and a restoration module, configured to consider components and system operation constraints for the distribution system, according to the routing table constraints and the arrival time constraints built by the communication agent, the repair agent and the electric agent, interdependence constraints between the repair crew scheduling and the distribution system sequence restoration obtained by the interdependency relationship module and interdependence constraints between the mobile communication vehicle scheduling and the distribution system sequence restoration obtained by the interdependency relationship module, regard minimizing a total weighted unserved energy, a total repair time and a use time cost of mobile emergency communication vehicles as a goal, build the comprehensive optimization model of coordination between the distribution system restoration and the emergency mobile communication based on the variable time step method, and solve the comprehensive optimization model to obtain results of the cooperative cyber-physical distribution system restoration.

Compared with the prior art, the disclosure has the following advantages and beneficial effects.

The cooperative cyber-physical distribution system restoration method based on emergency mobile communications provided by the disclosure utilizes an advanced wireless emergency communication technology and maximize network resources to restore the situational awareness of the distribution system in events that some network devices are damaged or powered off and unavailable after disasters. The disclosure studies cyber-physical characteristics and evolution mechanism of the distribution automation communication network and the load restoration operation in the distribution system load restoration, and puts forward a comprehensive restoration strategy of coordination among the communication network self-healing restoration and the distribution system load restoration. The optimization model of the distribution system sequence restoration based on the variable time step method is formulated as mixed integer linear programming (MILP) model, and the proposed cooperative cyber-physical distribution system restoration can be applied to the post disaster communication path restoration and the distribution system load restoration, and provide reference suggestions for emergency repair departments.

Furthermore, mobile communication vehicles can maximize the restoration of the distribution automation function in the distribution system after the disasters, so that the quick closing operation of remote switches can work after the disasters, so as to restore load power supply. Based on the communication coverage of mobile communication vehicles and its influence on distribution automation switches, modeling the optimal path for mobile communication vehicles can be established. The moving path of mobile communication vehicles can be described in an N*N table, which is called the routing table, and N represents a number of sites to be visited by mobile communication vehicles.

Furthermore, the path optimization of mobile communication vehicles needs to consider a problem of time dimension. There needs to be a strict priority relationship between the time when the mobile communication vehicle visits the next working site and the time when the mobile communication vehicle visits the previous site, and there is also a certain limit on the time of deployment at a site. Therefore, it is necessary to set time vector constraints of mobile communication vehicles.

Furthermore, in order to restore the power supply of the distribution system as soon as possible, it is necessary to arrange repair crews to quickly repair or replace damaged components, so it is necessary to model the optimal path for repair crews. The route of repair crews can also be described by the routing table, according to which space vector constraints for the deployment of repair crews can be obtained.

Furthermore, the deployment of repair crews needs to consider the time level. There is a strict priority relationship between the time when repair crews visit the next fault point and the time when repair crews visit the previous fault point. Therefore, it is necessary to set time vector constraints for repair crews.

Furthermore, the sequence restoration of the distribution system can also be established as the path optimization problem. The concept of virtual "electric agent" is introduced, and the moving behavior of the "electric agent" is used to simulate the energy flow paths during the distribution system restoration; the path optimization problem of the electric agent is connected with the problem of switches and node cells starting to restore power supply through the routing tables and arrival time vectors, and restoration orders of different node cells are established by comparing the time when different node cells start to be energized.

Furthermore, considering cyber-physical characteristics among the distribution automation communication system restoration and the load restoration operation, and the interdependence between the repair crew scheduling and the load restoration, modeling the scheduling of mobile communication vehicles, the travel route of repair crews, and the distribution system load restoration to obtain the optimal path of mobile communication vehicles, which can make automatic terminal devices rely on the "golden time" provided by the backup battery to achieve load restoration quickly, and effectively improve the resilience of the distribution system.

Furthermore, taking the total weighted unserved energy, the total repair time and the total time for mobile communication vehicles to move and deploy as the objective function, using the variable time step method and considering operation constraints of the distribution system, building a mixed integer linear programming (MILP) optimization model of coordination between the distribution system restoration and the mobile emergency communication based on the variable time step method. By selecting the time step corresponding to the operation behavior that affects distribution system restoration results and ignoring the rest of the "redundant" time step, the number of the time steps of the actual optimization problem is reduced, and the goal of reducing the computational complexity in the time dimension is achieved.

To sum up, the disclosure establishes the optimization model for cooperative cyber-physical distribution system restoration based on mobile emergency communications, and uses the commercial optimization solver to optimize the distribution system repair and distribution system restoration, so as to repair fault components and restore the critical load as soon as possible, effectively improving the resilience of the distribution system.

The following is a further detailed description of the technical solutions of the disclosure through the accompanying drawings and embodiments.

DETAILED DESCRIPTION OF THE EMBODIMENTS

Figure 1:
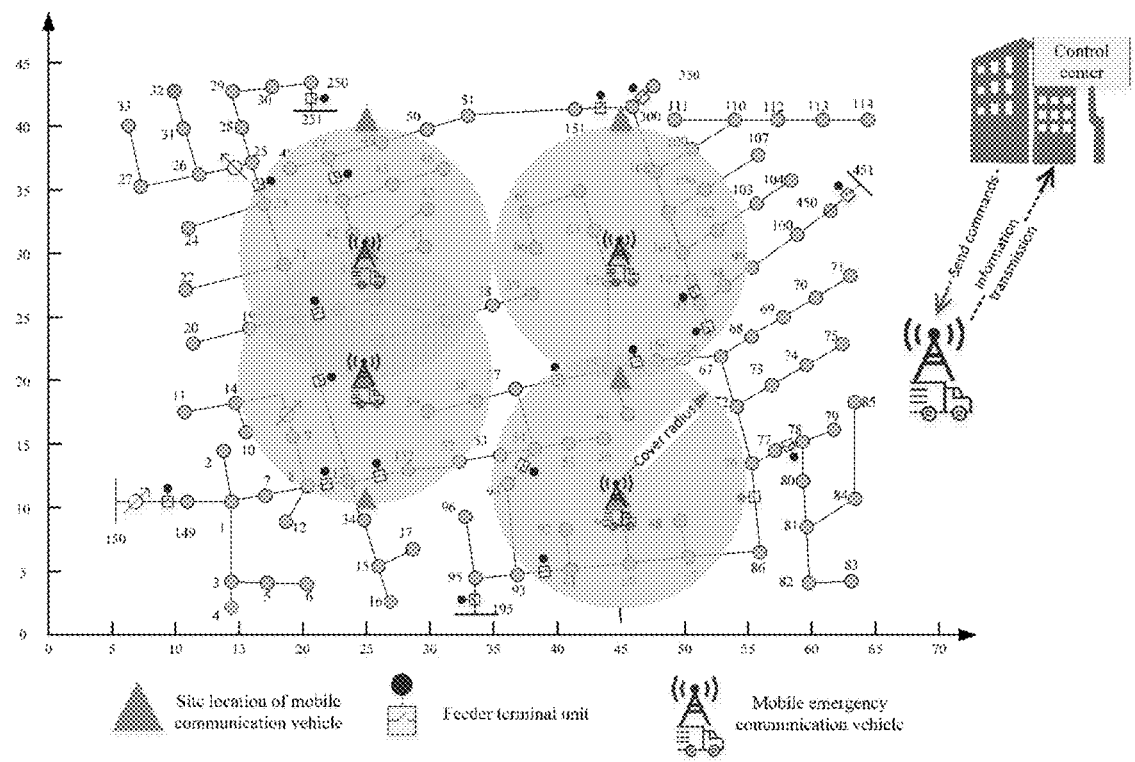
FIG. 1 is a deployment diagram of mobile emergency communication vehicles based on a 123-node feeder system.

The technical solutions in the embodiments of the disclosure will be clearly and completely described below in combination with the drawings in the embodiments of the disclosure. Apparently, the described embodiments are some of the embodiments of the disclosure, not all of them. Based on the embodiments in the disclosure, all other embodiments obtained by those skilled in the art without making creative work belong to the scope of the disclosure.

In the description of the disclosure, it should be understood that the terms "include" and "contain" indicate the existence of the described features, whole, steps, operations, elements and/or components, but do not exclude the existence or addition of one or more other features, whole, steps, operations, elements, components and/or sets thereof.

It should also be understood that the terms used in the description of the disclosure are only for the purpose of describing specific embodiments and are not intended to limit the disclosure. As used in the description of the disclosure and the appended claims, "a", "one" and "this" in the singular form are intended to include the plural form unless the context clearly indicates other circumstances.

It should also be further understood that the term "and/or" used in the description of the disclosure and the appended claims refers to any combination of one or more of the items listed in the associated list and all possible combinations, and includes these combinations.

Various structural diagrams according to the disclosed embodiments of the disclosure are shown in the accompanying drawings. These figures are not drawn to scale, in which some details are enlarged for the purpose of clear expression, and some details may be omitted. The shapes of various areas and layers shown in the figure and the relative size and position relationship between them are only exemplary. In practice, there may be deviations due to manufacturing tolerances or technical limitations, and those skilled in the art can additionally design areas/layers with different shapes, sizes and relative positions according to actual needs.

The disclosure provides a cooperative cyber-physical distribution system restoration method based on emergency mobile communications, which first evaluates the system damage degree and obtains the data of damaged and faulted lines. On this basis, mobile emergency communication vehicles are used to improve the situational awareness of the distribution system, so that the distribution automation function can be restored, and the quick closing operation of remote switches can work after extreme disasters. Emergency communication vehicles are represented by "communication agent", and a scheduling model of emergency communication resources is established through a routing table model; then, the emergency repair job of fault components in the distribution system is modeled, and repair crews are represented by "repair agent (RA)", and the post disaster emergency repair scheduling model is built through the repair routing table; the energy flow path of the distribution system is represented by virtual "electric agent (EA)", and the path optimization problem of the electric agent is modeled by the routing table and the arrival time vector; finally, the arrival time of agents is used to constrain the interdependence between the self-healing restoration of the communication network and the distribution system load restoration. Using the variable time step load restoration model, considering system operation constraints and the components restored by the distribution system, the comprehensive optimization model of coordination between the distribution system restoration and the mobile emergency communication based on the variable time step method can be established.

The disclosure provides a cooperative cyber-physical distribution system restoration method based on emergency mobile communications, including steps S1 to S6.

S1, evaluating the damage of the distribution system, obtaining the data of damaged and faulted lines, and clarifying (i.e., determining) locations of working sites for mobile emergency communication vehicles.

S2, building a routing model of mobile emergency communication vehicles, considering a routing table and a time vector model, and a superscript "C" is used to represent the communication agent (CA), that is, the mobile emergency communication vehicle.

Independent constraints in the routing table are shown as formula (1) to formula (6):

$$x_{ii}^C = 1, \forall i \in D^C \quad (1);$$

$$x_{ii}^C = 0, \forall i \in W^C \quad (2);$$

$$x_{ij}^C = 0, \forall i \in D^C \cup W^C, j \in D^C, i \neq j \quad (3);$$

$$x_{ij}^C + x_{ji}^C \leq 1, \forall i,j \in D^C \cup W^C \quad (4);$$

$$\Sigma_{j=1, j \neq i}^{n^{CA}} x_{ij}^C \leq n_{cap,i}^C, \forall i \in D^C \quad (5);$$

$$\Sigma_{j=1}^{n^{CA}} x_{ij}^C \leq \Sigma_{h=1}^{n^{CA}} x_{hi}^C \leq 1, \forall i \in W^C \quad (6).$$

Where $x_{ii}^C$ represents the element in the routing table of the mobile emergency communication vehicles, $x_{ij}^C$ represents the element in the routing table of the mobile emergency communication vehicles, which is a binary variable, if the mobile emergency communication vehicle moves from i to j, $x_{ij}^C = 1$, $n^{CA}$ represents the number of candidate deployment sites for mobile emergency communication vehicles (also referred to as the number of working sites for mobile emergency communication vehicles), $n_{cap,i}^C$ represents the number of mobile communication vehicles owned by the working site i, $D^C$ represents a gathering center of mobile communication vehicles, and $W^C$ represents a set of working sites for mobile communication vehicles. Formulas (1) to (3) indicate that mobile communication vehicles should start from the gathering center of mobile communication vehicles but will not return to the gathering center of mobile communication vehicles, formula (4) indicates that the mobile communication vehicle will not repeat the same path, formula (5) indicates that the number of mobile communication vehicles dispatched by the gathering center of mobile communication vehicles is limited, and formula (6) indicates that one communication working site can only be accessed by one mobile communication vehicle at most.

Independent constraints of moving time vectors are shown as formula (7) to formula (11):

$$t_i^{Ca} = t_i^{Cd} = T_{ii}^C, \forall i \in D^C; \quad (7)$$

$$t_i^{Ca} \leq t_i^{Cd} \leq T^{MAX}, \forall i \in W^C; \quad (8)$$

$$\left.\begin{array}{l} t_j^{Ca} \geq t_i^{Cd} + T_{ij}^C - (1-x_{ij}^C)M \\ t_j^{Ca} \leq t_i^{Cd} + T_{ij}^C + (1-x_{ij}^C)M \end{array}\right\}, \forall i \in D^C \cup W^C, j \in W^C; \quad (9)$$

$$\left.\begin{array}{l} t_j^{Ca} \geq T^{MAX} - M\sum_{k=1,i \neq j}^{n^{CA}} x_{ij}^C \\ t_j^{Ca} \leq T^{MAX} + M\sum_{k=1,i \neq j}^{n^{CA}} x_{ij}^C \end{array}\right\}, \forall i \in W^C; \quad (10)$$

$$t_j^{Cd} \leq t_j^{Ca} + T_j^{Cmin} - \left(1 - \sum_{k=1,i \neq j}^{n^{CA}} x_{ij}^C\right)M, \forall j \in W^C. \quad (11)$$

Where $t_i^{Ca}$ and $t_i^{Cd}$ respectively represent the time for the communication agent to arrive the working site i and to leave the working site i, $T_{ii}^C$ represents the start time for a path of mobile communication vehicles, $T^{MAX}$ represents a maximum moving time limit for mobile communication vehicles, $T_{ij}^C$ represents the time for the mobile communication vehicle to move from the working sites i to j, M represents a constant, $T_j^{Cmin}$ represents a minimum time for the mobile communication vehicle to stay at the working site j. Formula (7) indicates that mobile communication vehicles start from the gathering center, formula (8) indicates that the time for mobile communication vehicles to leave working sites should be greater than the arrival time and not exceed the maximum time limit, formula (9) indicates a relationship between the time for the mobile communication vehicle to arrive at the working site j and leave the previous working site i, and formula (10) limits that the visited time of the working site j should not exceed a certain value, and formula (11) represents a time relationship between leaving the working site j and arriving the working site j for the mobile communication vehicle.

S3, considering a routing table of repair crews and a time vector model of repair crews, a dispatch model of repair crews is built, and a superscript "R" is used to represent the repair agent.

Independent constraints in the repair routing table (i.e., independent repair routing table constraints, or travel path constraints) of repair crews are shown as formula (12) to formula (17):

$$x_{ii}^R = 1, \forall i \in D^R \tag{12}$$

$$x_{ii}^R = 0, \forall i \in W^R \tag{13}$$

$$x_{ij}^R = 0, \forall i \in D^R \cup W^R, j \in D^R, i \neq j \tag{14}$$

$$x_{ij}^R + x_{ji}^R \leq 1, \forall i,j \in D^R \cup W^R \tag{15}$$

$$\sum_{j=1, j \neq i}^{n^{RA}} x_{ij}^R \leq n_{cap,i}^R, \forall i \in D^R \tag{16}$$

$$\sum_{j=1}^{n^{RA}} x_{ij}^R \leq \sum_{h=1}^{n^{RA}} x_{hi}^R \leq 1, \forall i \in W^R \tag{17}$$

Where $x_{ij}^R$ and $x_{ii}^R$ respectively represent elements in the repair routing table of repair crews, and the meanings of the formula (12) to (17) are the same as that of the constraints of the routing table of mobile communication vehicles in S2.

Independent constraints for traveling time of repair crews are shown as formula (18) to formula (23):

$$t_i^R = T_{ii}^R, \forall i \in D^R; \tag{18}$$

$$\left.\begin{array}{l} t_j^R \geq t_i^R + T_{ij}^R + T_i^{RP} + T_i^{MS} - (1 - x_{ij}^R)M \\ t_j^R \leq t_i^R + T_{ij}^R + T_i^{RP} + T_i^{MS} + (1 - x_{ij}^R)M \end{array}\right\}, \tag{19}$$

$$\forall i \in SW \cap FR, \forall j \in W^R, i \neq j;$$

$$\left.\begin{array}{l} t_j^R \geq t_i^R + T_{ij}^R + T_i^{RP} - (1 - x_{ij}^R)M \\ t_j^R \leq t_i^R + T_{ij}^R + T_i^{RP} + (1 - x_{ij}^R)M \end{array}\right\}, \forall i \in FR \backslash SW, \forall j \in W^R, i \neq j; \tag{20}$$

$$\left.\begin{array}{l} t_j^R \geq T^{MAX} - M \sum_{k=1, i \neq j}^{n^{RA}} x_{ij}^R \\ t_j^R \leq T^{MAX} + M \sum_{k=1, i \neq j}^{n^{RA}} x_{ij}^R \end{array}\right\}, \forall j \in W^R; \tag{21}$$

$$f_{r^e(f)}^R \geq t_f^R + T_f^{RP}, \forall f \in FR \backslash SW; \tag{22}$$

$$f_i^R = T_{ii}^R, \forall f \in FR \backslash SW, i \neq r^e(f). \tag{23}$$

Where $t_i^R$ represents the time for repair crews to arrive a fault point i (also referred to as fault component i), $T_{ij}^R$ represents the time for repair crews to move between two fault components, $x_{ij}^R$ represents the element in the repair routing table of repair crews, which is a binary variable, when repair crews move from i to j, $x_{ij}^R = 1$, $T_i^{RP}$ represents the time for repair crews to repair the fault component i, $T_i^{MS}$ represents the time for repair crews to manually operate the faulted line switch, $n^{RA}$ represents the sum of the number of fault points and working sites, $f_i^R$ represents the time for fault components in the node cell i to be repaired, $D^R$ represents a set of working sites, $W^R$ represents a set of repair sites for repair crews, FR represents a set of fault components, and $r^e(f)$ represents an index conversion of the fault component i from RA to EA. Formula (18) defines the starting time when repair crews start moving, and formulas (19) and (20) respectively define the time from a repair site to the faulted line with switch and without switch. Formula (21) defines the time range of component emergency repair, formula (22) indicates that the repair time of the node cell where the fault is located, which refers to the maximum value of all the fault repair completion time in the node cell, and formula (23) indicates that the repair time of the node cell without the fault component, which is set as the starting time.

S4, considering an electrical routing table of the distribution system and a time vector model of the distribution system, a restoration model of the distribution system is built, and a superscript "E" is used to represent the electric agent, that is, the repair crews.

Independent constraints of the electrical routing table are shown as formula (24) to formula (30):

$$x_{ii}^E = 1, \forall i \in g^E \tag{24}$$

$$x_{ii}^E = 0, \forall i \in C^E \backslash g^E \tag{25}$$

$$x_{ij}^E = 0, \forall i \in C^E, j \in g^E, i \neq j \tag{26}$$

$$x_{ij}^E = x_{ji}^E = 0, \forall (i,j) \notin SW \tag{27}$$

$$x_{ij}^E + x_{ji}^E \leq 1, \forall (i,j) \in SW \tag{28}$$

$$\sum_{h=1}^{n^{EA}} x_{hi}^E \leq 1, \forall i \in C^E \tag{29}$$

$$\sum_{j=1}^{n^{EA}} x_{ij}^E \leq n^{EA} \sum_{h=1}^{n^{EA}} x_{hi}^E, \forall i \in C^E \tag{30}$$

Where $x_{ij}^E$ and $x_{ji}^E$ respectively represents elements in the electrical routing table, which are binary variables, if there is electrical path between node cells i and j, $x_{ij}^E = 1$, $n^{EA}$ represents a number of node cells of the distribution system, $C^E$ represents a set of node cells, $g^E$ represents a set of node cells with black start generator or substation, and SW represents a set of switches (also referred to as a set of line switches). Formulas (24) to (26) indicate that the energy flow path should start from the "source node cell" with the black start generator or the substation, formula (27) indicates that the energy flow path between two nodes without switch connection does not exist, formula (28) indicates that the electric agent cannot move more than once along the same path, formula (29) indicates that the distribution system operates in the radial topology, and formula (30) indicates that the energy flow path leaving a node cell can split into multiple paths to meet requirements of tree topology.

Independent time constraints of the distribution system are shown as formula (31) and formula (32):

$$t_i^E = T_{ii}^E, \forall i \in g^E; \tag{31}$$

$$\left.\begin{array}{l} t_j^E \geq T^{MAX} - M \sum_{k=1, i \neq j}^{n^{EA}} x_{ij}^E \\ t_j^E \leq T^{MAX} + M \sum_{k=1, i \neq j}^{n^{EA}} x_{ij}^E \end{array}\right\}, \forall i \in C^E \backslash g^E. \tag{32}$$

Where $t_i^E$ represents the time for the node cell i to be energized, $T_{ii}^E$ represents the starting time for a source node to be energized. Formula (31) indicates that the source node is energized from the beginning, and formula (32) defines a restoration time range of the distribution system.

S5, determining dependency relationships among repair crew scheduling, mobile communication vehicle scheduling and distribution system sequence restoration, according to the routing table constraints and the arrival time constraints built by the communication agent, the repair agent and the electric agent. It should be noted that repair crews can operate a manual switch on the line immediately after repairing this faulted line, and can operate other healthy manual switches.

Interdependent constraints between the mobile communication vehicle scheduling and the distribution system sequence restoration are shown as formula (33) to formula (39):

$$x_{ij}^E = d_{ij}^{AO} + d_{ij}^{MO}, \forall (i,j) \in SW \tag{33}$$

$$d_{ij}^{AO} \leq \sum_{h=1, h \neq k}^{CA} x_{hk}^{CA} C_k \in W_{(i,j)}^C \tag{34}$$

$$t_j^E \geq t_k^{Ca} - (2 - d_{ij}^{AO} - \sum_{h=1, h \neq k}^{CA} x_{hk}^C)M, \forall k \in W_{(i,j)}^C \tag{35}$$

$$t_j^E \leq t_k^{Cd} - (2 - d_{ij}^{AO} - \sum_{h=1, h \neq k}^{CA} x_{hk}^C)M, \forall k \in W_{(i,j)}^C \tag{36}$$

$$t_k^{Cd} \geq \max(t_i^E, f_j^R) + T_{(i,j)}^{AS} - (2 - d_{ij}^{AO} - \sum_{h=1, h \neq k}^{CA} x_{hk}^C)M,$$
$$\forall k \in W_{(i,j)}^C \tag{37}$$

$$t_j^E \geq \max(t_i^E, f_j^R) + T_{(i,j)}^{AS} - (1 - d_{ij}^{AO})M \tag{38}$$

$$\max(t_i^E, f_j^R) \leq RT_{(i,j)} + (1 - d_{ij}^{AO})M \tag{39}$$

Where $d_{ij}^{AO}$ and $d_{ij}^{MO}$ each are binary variables indicating if the switch (i,j) is automatically/manually operated from i to j; $T_{(i,j)}^{AS}$ represents the operation time of an automatic switch, $RT_{(i,j)}$ represents the residual time of the backup battery of a feeder terminal unit (FTU) on the line (i,j), $W_{(i,j)}^C$ represents a set of working sites that can cover the feeder terminal unit (FTU) (i,j)'. Formula (33) indicates that healthy automatic switches, they can either be closed remotely by DA or manually by repair crews; formula (34) indicates that the line remote switch can be operated only after the communication function of FTU is restored; formulas (35) to (36) indicate that the remote operation time of the automatic switch (i,j) should be within the time interval $[t_k^{Ca}, t_k^{Cd}]$; formula (37) indicates that the mobile communication vehicle needs to ensure that the line (i,j) is energized before leaving this area; formula (38) indicates that the node cell j can be energized only after the fault is repaired and the line switch is closed; formula (39) indicates that if the FTU is installed at the i end of the line, it should be ensured that the node cell i or the node cell j has been energized before the FTU backup battery is used up.

Interdependent constraints between the repair crew scheduling and the distribution system sequence restoration are shown as formula (40) to formula (49):

$$d_{ij}^{MO} + d_{ji}^{MO} = \sum_{h=1, h \neq k}^{n^{RA}} x_{hk}^R, \forall (i,j) \in SW, k = e^r(i,j); \tag{40}$$

$$\left. \begin{array}{l} d_{ij}^{MOe} + d_{ij}^{MOde} \geq 1 - (1 - d_{ij}^{MO})M \\ d_{ij}^{MOe} + d_{ij}^{MOde} \leq 1 + (1 - d_{ij}^{MO})M \end{array} \right\}, \forall (i,j) \in SW; \tag{41}$$

$$\frac{t_{e^r(i,j)}^R - t_i^E}{M} \leq d_{ij}^{MOe} \leq \frac{t_{e^r(i,j)}^R - t_i^E}{M} + 1, \forall (i,j) \in SW; \tag{42}$$

$$\left. \begin{array}{l} t_j^E \geq t_{e^r(i,j)}^R + T_{(i,j)}^{MS} - (2 - d_{ij}^{MO} - d_{ij}^{MOe})M \\ t_j^E \leq t_{e^r(i,j)}^R + T_{(i,j)}^{MS} + (2 - d_{ij}^{MO} - d_{ij}^{MOe})M \end{array} \right\}, \forall (i,j) \in SW/F; \tag{43}$$

$$\left. \begin{array}{l} t_j^E \geq t_{e^r(i,j)}^R + T_{(i,j)}^{MS} + T_{(i,j)}^{RP} - (2 - d_{ij}^{MO} - d_{ij}^{MOe})M \\ t_j^E \leq t_{e^r(i,j)}^R + T_{(i,j)}^{MS} + T_{(i,j)}^{RP} + (2 - d_{ij}^{MO} - d_{ij}^{MOe})M \end{array} \right\}, \forall (i,j) \in SW \cap F; \tag{44}$$

$$\frac{t_i^E - (t_{e^r(i,j)}^R + T_{(i,j)}^{MS})}{M} \leq d_{ij}^{MOde} \leq \frac{t_i^E - (t_{e^r(i,j)}^R + T_{(i,j)}^{MS})}{M} + 1,$$
$$\forall (i,j) \in SW \backslash F; \tag{45}$$

$$\frac{t_i^E - (t_{e^r(i,j)}^R + T_{(i,j)}^{RP} + T_{(i,j)}^{MS})}{M} \leq d_{ij}^{MOde} \leq \frac{t_i^E - (t_{e^r(i,j)}^R + T_{(i,j)}^{RP} + T_{(i,j)}^{MS})}{M} + 1,$$
$$\forall (i,j) \in SW \cap F; \tag{46}$$

$$\left. \begin{array}{l} t_j^E \geq t_i^E - (2 - d_{ij}^{MO} - d_{ij}^{MOde})M \\ t_j^E \leq t_i^E + (2 - d_{ij}^{MO} - d_{ij}^{MOde})M \end{array} \right\}, \forall (i,j) \in SW; \tag{47}$$

$$\left. \begin{array}{l} t_i^E \geq t_{e^r(i,j)}^R + T_{(i,j)}^{RP} \\ t_j^E \geq t_{e^r(i,j)}^R + T_{(i,j)}^{RP} \end{array} \right\}, \forall (i,j) \in SW \cup F; \tag{48}$$

$$t_i^E \geq f_i^R, \forall i \in C^E. \tag{49}$$

Where $d_{ij}^{MOe}$ and $d_{ij}^{MOde}$ are binary variables indicating if the switch (i,j) is manually operated from i to j with/without electricity; $e^r(i,j)$ represents an index conversion of the switch (i,j) from EA to RA. Formula (40) indicates that the manual switch (i,j) is operated by repair crews, formula (41) indicates that if switch (i,j) is operated by repair crews, it will be either energized or de-energized during the operation energized, formula (42) indicates that for the energized operation of the switch (i,j) from i to j to energize the node cell j, the node cell i has been energized before the repair crew arrives at it energized; formulas (43) and (44) indicate that the node cell j will be restored immediately after repair crews close switch (i,j) if the switch (i,j) is healthy, or the switch (i,j) will be switched on after it is repaired if the switch (i,j) is damaged; formulas (45) and (46) indicate that when switch (i,j) is de-energized operated from i to j, the node cell i can be energized after the switch (i,j) is repaired and closed; formula (47) indicates that the node cells on two sides of the switch (i,j) will be energized at the same time when it is de-energized operated; formula (48) indicates that the node cell i on the side of the fault line switch should be energized after the line is repaired; and formula (49) indicates that the energized time of the node cell i should be after all fault components inside are repaired.

S6, considering operation constraints of the distribution system, building a comprehensive optimization model of coordination between the distribution system restoration and mobile emergency communication based on the variable time step method. Mobile communication vehicles are used to improve the situational awareness of the distribution system, maximize the available capacity of distribution automation devices, and achieve the quick closing operation of remote switches after the disasters; thus, loads can be restored within the time when the FTU backup battery is available, and the "golden time" of post disaster load restoration is seized, reducing the loss of power outages. An objective function of the comprehensive optimization model is to maximize the restoration of the distribution system while minimizing the time cost of repair dispatch and mobile communication vehicle deployment. The model considers the space and time vector constraints among mobile communication vehicle deployment, repair dispatch and distribution system load restoration. The optimal path among mobile communication vehicles, the repair crew dispatch and the load restoration can be obtained from model solution results.

The basic starting point is to reduce the number of time steps of the actual optimization problem and achieve the goal of reducing the computational complexity in the time dimension by selecting only the time steps corresponding to the operation behavior that affects the restoration results of the distribution system and ignoring the rest of the "redundant" time steps.

The energization status of node cells and switches are linked to the routing table of EA through the formula (50) to formula (52):

$$x_{c_i,t_j}^E = \begin{cases} 0; t_i \geq t_j \\ 1; t_i \leq t_j \end{cases}, \forall c_i \in C^E, \forall t_i, t_j \in P; \quad (50)$$

$$x_{c_i,t_j}^E = \sum_{h=1}^{n^{EA}} x_{hi}^E, \forall c_i \in C^E; \quad (51)$$

$$x_{c_i,c_j,t_k}^B = (x_{ij}^E + x_{ji}^E) x_{c_i,t_k}^E x_{c_j,t_k}^E, \forall c_i, c_j \in C^E, (i,j) \in SW. \quad (52)$$

Where $x_{c_i,t_j}^E$ represents an energization status of a node cell $c_i$ at the time $t_j$; $t_i$ and $t_j$ are both check points, $t_p$ represents a last check point, $x_{hi}^E$ represents an energy flow path of the node cells h to i. Formula (50) indicates that the energization status of the node cell at a certain check point depends on whether the node cell is energized before or after the time, formula (51) indicates that whether the node cell $c_i$ is energized at the $t_p$ time depends on whether the node cell is visited by EA; formula (52) indicates whether the switch (i,j) is energized at the $t_p$ time depends on whether the path is visited by EA and whether the node cells at its two ends are energized at the $t_p$ time.

The objective function of the model is shown as formulas (53) to (56):

$$\min Obj = \beta^E Obj^E + \beta^R Obj^R + \beta^C Obj^C \quad (53);$$

$$Obj^E = \sum_{c \in C^E} w_c^E t_c^E \sum_{l \in L_c} \sum_{\emptyset \in \Phi} P_{l,\emptyset}^L \quad (54);$$

$$Obj^R = w_1^R \sum_{i=1}^{n^{RA}} \sum_{j=1, j \neq i}^{n^{RA}} x_{ij}^R T_{ij}^R + w_2^R \sum_{i=1}^{n^{EA}} f_i^R \quad (55);$$

$$Obj^C = w_1^C \sum_{i=1}^{n^{CA}} \sum_{j=1, j \neq i}^{n^{CA}} x_{ij}^C T_{ij}^C + w_2^C \sum_{i \in w} c(t_i^{Cd} - t_i^{Ca}) \quad (56).$$

Where $Obj^E$, $Obj^R$ and $Obj^C$ are three sub objective functions, which respectively represent the total weighted unserved energy, the total repair time, the deployment and use time of mobile communication vehicles; $\beta^E$, $\beta^R$ and $\beta^C$ are coefficients in front of the three sub objective functions respectively, we represents a weight value of a node cell, $t_c^E$ represents the time of the node cell c to be energized, $P_{l,\emptyset}^L$ represents a load at the node l. In the formula (54), the objective function represents the weighted load restoration. In the formula (55), the objective function represents the repair time. In the formula (56), the objective function represents the deployment and use time of the mobile communication vehicle.

In another embodiment of the disclosure, a cooperative cyber-physical distribution system restoration system based on mobile emergency communications is provided, which can be used to realize the above cooperative cyber-physical distribution system restoration method based on mobile emergency communications. Specifically, the cooperative cyber-physical distribution system restoration system based on mobile emergency communication includes a data module, a communication agent module, a repair agent module, an electric agent module, a relationship module (i.e., interdependency relationship module) and a restoration module.

The data module is configured to obtain the data of damaged and faulted lines of the distribution system, and determine locations of line switches and locations of working sites for mobile emergency communication vehicles.

The communication agent module is configured to model the optimal path for the mobile communication vehicles based on working site locations of mobile communication vehicles obtained by the data module, and obtain moving path constraints and moving time constraints of mobile communication vehicles. The mobile communication vehicle is represented by the communication agent.

The repair agent module is configured to model repair crews dispatch to repair fault components based on the data of faulted lines obtained by the data module, and obtain travel path constraints and travel time constraints for a dispatch model of repair crews, which are represented by the repair agent.

The electric agent module is configured to model the distribution system load restoration based on the topology of the distribution system and positions of line switches obtained by the data module, introduce a concept of an electric agent and establish the relationship between a path optimization problem of the electric agent and the distribution system restoration problem through a routing table and arrival time vectors, obtain electrical path constraints and electrical time constraints of the distribution system. The energy flow path of the distribution system is represented by the electric agent.

The interdependency relationship module is configured to determine dependency relationships among repair crew scheduling, mobile communication vehicle scheduling and distribution system sequence restoration, based on the routing table constraints and the arrival time constraints built by the communication agent, the repair agent and the electric agent.

The restoration module is configured to consider components and system operation constraints for the distribution system according to the routing table constraints and the arrival time constraints built by the communication agent, the repair agent and the electric agent, interdependence constraints between the repair crew scheduling and the distribution system sequence restoration obtained by the interdependency relationship module, and interdependence constraints between the mobile communication vehicle scheduling and the distribution system sequence restoration obtained by the interdependency relationship module, regard minimizing a total weighted unserved energy, a total repair time and a use time cost of mobile emergency communication vehicles as a goal, build the comprehensive optimization model of coordination between the distribution system restoration and the emergency mobile communication based on the variable time step size method; and solve the comprehensive optimization model to obtain results of the cooperative cyber-physical distribution system restoration.

In a still another embodiment of the disclosure, a terminal device is provided, the terminal device includes a processor and a memory. The memory is used to store computer programs, the computer programs include program instructions, and the processor is used to execute the program instructions stored in a computer storage medium. The processor may be a central processing unit (CPU), other general-purpose processors, digital signal processors (DSP), application specific integrated circuit (ASIC), field-programmable gate array (FPGA) or other programmable logic devices, discrete gate or transistor logic devices, discrete hardware components, etc., the processer is computing core and control core of the terminal, which is suitable for realizing one or more instructions, specifically suitable for loading and executing one or more instructions to realize the corresponding method flow or corresponding functions. The processor described in the embodiment of the disclosure can be used for the operation of the cooperative cyber-physical distribution system restoration method based on mobile emergency communications, including:

obtaining the data of damaged and faulted lines of the distribution system, and determining locations of line switches and locations of working sites for mobile emergency communication vehicles; modeling the optimal path for mobile emergency communication vehicles based on the working site locations of mobile communication vehicles, and obtaining moving path constraints and moving time constraints of mobile communication vehicles, the mobile communication vehicle being represented by the communication agent; modeling repair crews dispatch to repair fault components based on the data of faulted lines, obtaining travel path constraints and travel time constraints in the dispatch model of repair crews which are represented by the repair agent; modeling the distribution system load restoration based on the topology of the distribution system and positions of line switches, introducing a concept of an electric agent and establishing the relationship between a path optimization problem of the electric agent and the distribution system restoration problem through routing tables and arrival time vectors, obtaining electrical path constraints and electrical time constraints of the distribution system, and an energy flow path of the distribution system being represented by the electric agent; determining dependency relationships among repair crew scheduling, mobile communication vehicle scheduling and distribution system sequence restoration, based on routing table constraints and arrival time constraints built by the communication agent, the repair agent and the electric agent; and considering components and system operation constraints for the distribution system, regarding minimizing a total weighted unserved energy, a total repair time and a use time cost of mobile emergency communication vehicles as a goal, building the comprehensive optimization model of coordination between the distribution system restoration and the emergency mobile communication based on the variable time step size method, according to the routing table constraints and the arrival time constraints built by the communication agent, the repair agent and the electric agent, interdependence constraints between the repair crew scheduling and the distribution system sequence restoration, and interdependence constraints between the mobile communication vehicle scheduling and the distribution system sequence restoration; and solving the comprehensive optimization model to obtain results of the cooperative cyber-physical distribution system restoration.

In a still another embodiment of the disclosure, the disclosure further provides a storage medium, specifically a computer-readable storage medium (i.e., memory), which is a memory device in the terminal device for storing programs and data. It can be understood that the computer-readable storage media can include the built-in storage media in the terminal device and, of course, the extended storage media supported by the terminal device. The computer-readable storage medium provides a storage space, which stores the operating system of the terminal. In addition, one or more instructions suitable for being loaded and executed by the processor are also stored in the storage space, which can include one or more computer programs (including program codes). It should be noted that the computer-readable storage medium here can be high-speed random access memory (RAM) or non-volatile memory, such as at least one disk memory.

The processor can load and execute one or more instructions stored in the computer-readable storage medium to realize the corresponding steps of the cooperative cyber-physical distribution system restoration method based on mobile emergency communications in the above embodiment; one or more instructions in the computer-readable storage medium are loaded by the processor and perform the following steps:

obtaining the data of damaged and faulted lines of the distribution system, and determining locations of line switches and locations of working sites for mobile emergency communication vehicles; modeling the optimal path for mobile communication vehicles based on working site locations of mobile communication vehicles, and obtaining moving path constraints and moving time constraints of mobile communication vehicles, the mobile communication vehicle being represented by the communication agent; modeling repair crews dispatch to repair fault components based on the data of faulted lines, and obtaining travel path constraints and travel time constraints in the dispatch model of repair crews which are represented by the repair agent; modeling the distribution system load restoration based on the topology of the distribution system and positions of line switches, introducing a concept of an electric agent and establishing the relationship between a path optimization problem of the electric agent and distribution system restoration problem through routing tables and arrival time vectors, obtaining electrical path constraints and electrical time constraints of the distribution system, and an energy flow path of the distribution system being represented by the electric agent; determining dependency relationships among repair crew scheduling, mobile communication vehicle scheduling and distribution system sequence restoration, based on routing table constraints and arrival time constraints built by the communication agent, the repair agent and the electric agent; and considering operation constraints of the distribution system and components restored by the distribution system with objectives of minimizing a total weighted unserved energy, a total repair time and a use time cost of mobile emergency communication vehicles, building the comprehensive optimization model of coordination between the distribution system restoration and the emergency mobile communication based on the variable time step size method, according to the routing table constraints and the arrival time constraints built by the communication agent, the repair agent and the electric agent, interdependence constraints between the repair crew scheduling and the distribution system sequence restoration, and interdependence constraints between the mobile communication vehicle scheduling and the distribution system sequence restoration; and solving the comprehensive optimization model to obtain results of the cooperative cyber-physical distribution system restoration.

In order to make the purposes, technical solutions and advantages of the embodiments of the disclosure clearer, the technical solutions in the embodiments of the disclosure will be described clearly and completely below in combination with the accompanying drawings in the embodiments of the disclosure. Apparently, the described embodiments are some of the embodiments of the disclosure, not all of them. Generally, components in embodiments of the disclosure described and shown in the accompanying drawings can be arranged and designed through various different configurations. Therefore, the following detailed description of the embodiments of the disclosure provided in the accompanying drawings is not intended to limit the scope of the disclosure claimed, but only represents selected embodiments of the disclosure. Based on the embodiments of the disclosure, all other embodiments obtained by those skilled in the art without creative work belong to the scope of the disclosure.

Referring to FIG. 1, which shows the schematic diagram of a mobile communication of an on-board base station. In the distribution system, several candidate stations of emergency communication vehicles are set up for the deployment of mobile communication vehicles. Each mobile communication vehicle has a certain coverage radius. A mobile emergency communication vehicle and FTUs within its coverage can form a wireless network and restore the communication function with the control center, thus, FTU can receive the instructions issued by the control center when the backup battery is available.

In order to verify the effectiveness of the method proposed by the disclosure, the method is tested on IEEE 123-node feeder system. Among them, the main power supply is at node 150, there are four faults in the system, two depots which have 4 emergency repair crews, and 20 number of line switches are distributed in branches of the system. Among them, switches SW95-195, SW450-451, SW300-350, SW250-251 are open during the whole restoration process. Information such as candidate deployment sites of the mobile communication vehicles and the location of FTU can be obtained from FIG. 1. In order to embody the advantages of the disclosure, the following two cases are set.

Case 1: without considering the coordination of the mobile emergency communication, solving an optimization model of coordination between the emergency repair scheduling and the load restoration, and obtaining the emergency repair scheduling plan and load restoration results.

Case 2: considering the coordination between mobile emergency communication and repair scheduling, solving the comprehensive optimization model of coordination between the distribution system restoration and the mobile emergency communication, and obtaining the deployment plan, repair scheduling plan and load restoration results of mobile communication vehicles.

The difference between case 1 and case 2 is that case 2 considers the coordination of mobile emergency communication in the distribution system restoration and the coordination of mobile emergency communication is reflected in constraints, while case 1 does not. Through the comparison of the calculation results of the two cases, the resilience improvement of the advanced emergency communication technology in the distribution system restoration can be obtained.

The specific implementation steps are as follows:

For case 1, inputting the original data of the system and solving the following optimization problem:

$$\min Obj = \beta^E Obj^E + \beta^R Obj^R$$

St. (12)-(32), (40)-(51)

For case 2: inputting the original data of the system and solving the following optimization problem:

$$\min Obj = \beta^E Obj^E + \beta^R Obj^R + \beta^C Obj^C$$

St. (1)-(51)

Figure 2:
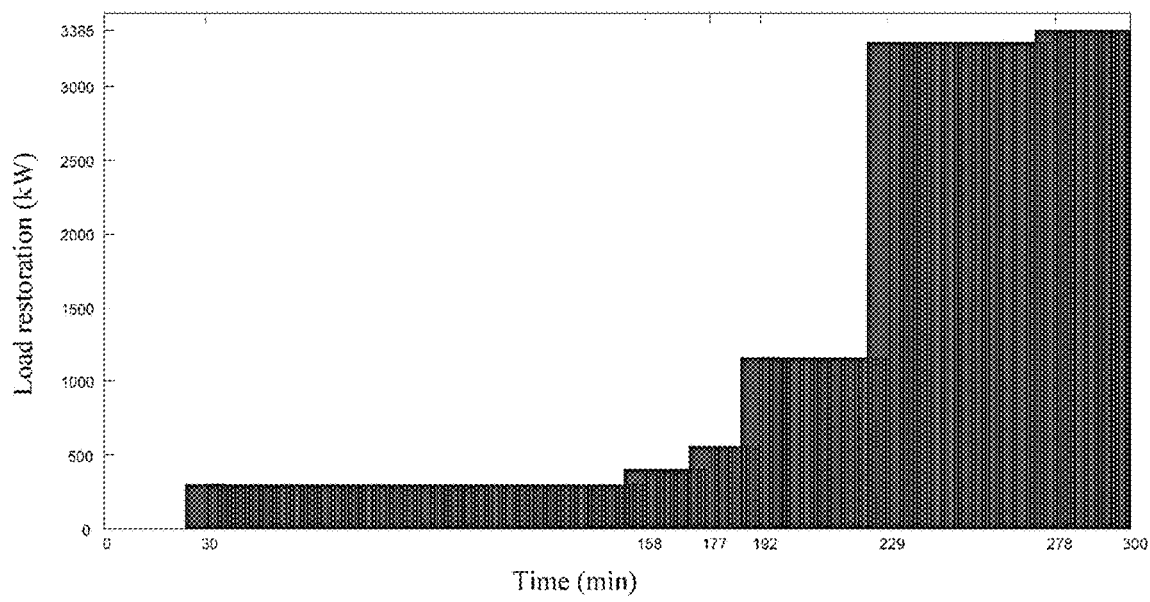
FIG. 2 is a schematic diagram of the distribution system restoration without considering the mobile emergency communication.
Figure 3:
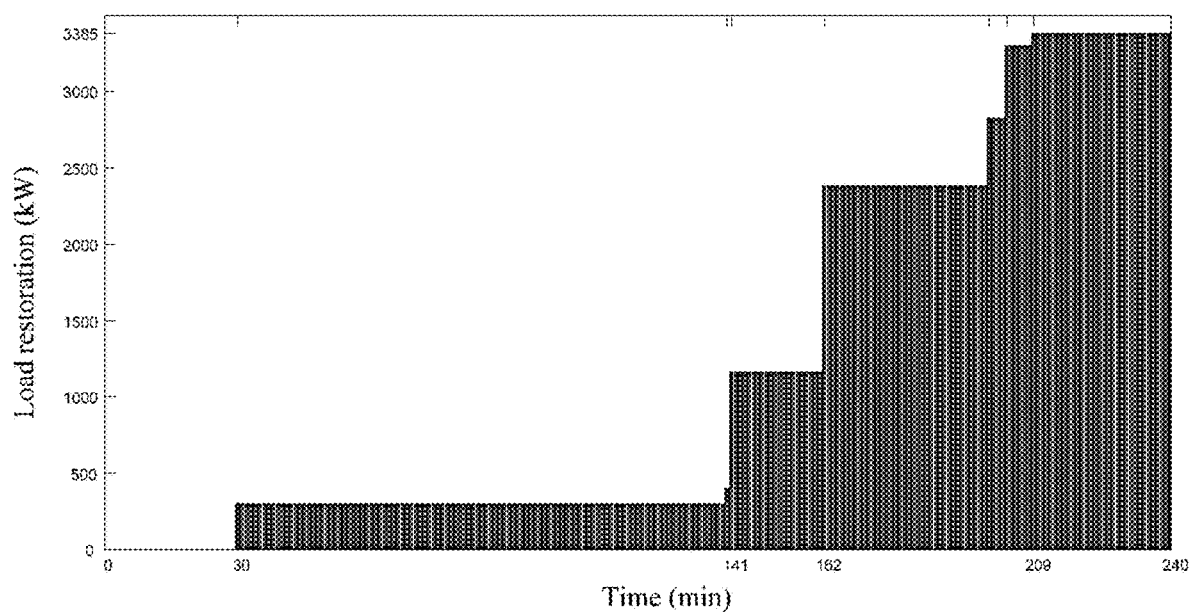
FIG. 3 is a schematic diagram of the cooperative cyber-physical distribution system restoration considering the mobile emergency communication.

The distribution system restoration in case 1 and case 2 can be shown in FIG. 2 and FIG. 3. Comparing the two histograms, it can be found that the system restoration speed in case 2 is faster, and the time required for the system to restore to normal state is about 1 hour, which is less than that in case 1. Table 1 compares the result data obtained under the two cases, and the following conclusions can be drawn: when using the restoration method in case 2, ① the total weighted unserved energy unserved energy of the system is smaller; ② because mobile communication vehicles restore some functions of power distribution automation, remote switches can be controlled, and some important loads can be restored before repair crews carry out manual operation, although the operation cost of mobile communication vehicles is increased, it has won valuable post disaster restoration time for the distribution system; ③ the travel distance and time of repair crews are reduced, which saves the post disaster repair cost. Furthermore, the comprehensive restoration strategy of coordination between the self-healing restoration of the communication network and the load restoration of the distribution system proposed by the disclosure has the more obvious effect on the distribution system resilience enhancement.

TABLE 1

Comparison of recovery results between the two cases

| Comparison result | Total weighted unserved energy/kW | Repair time/min | Time of moving and deployment of mobile emergency communication vehicles/min | Restoration time/min |
|---|---|---|---|---|
| Case 1 | 114000 | 1020 | 0 | 278 |
| Case 2 | 88400 | 978 | 194 | 209 |

To sum up, the disclosure provides the cooperative cyber-physical distribution system restoration method and system based on mobile emergency communications, which has the following characteristics.

1. The optimization decision-making technology of using mobile emergency communication vehicles to improve the situational awareness of distribution system under disasters achieves the restoration of the situational awareness of distribution system, under the condition that some network devices are damaged or powered off and unavailable, and ensuring the reliability of information acquisition and instruction transmission after the disasters.

2. During distribution system restoration, the cyber-physical characteristics of distribution automation communication system restoration and load restoration operation are considered. With the help of the wireless network composed of emergency communication vehicles, the reliable transmission of information and instructions are guaranteed, so that the automatic terminal devices can quickly restore the load power supply according to the "golden time" provided by the backup battery, effectively enhancing the resilience of distribution system.

3. The general routing model is introduced to model different objects in the comprehensive optimization model. The repair crews, mobile emergency communication resources and energy flow paths of the distribution system restoration are represented by "repair agent", "communication agent" and "electric agent" respectively, which are modeled as path optimization problems through routing table models and arrival time vector models, and the independent constraints of agent movement and the constraints expressing interdependence are established.

4. The optimization model of distribution system restoration based on the variable time step method reduces the computational complexity and improves the computational performance compared with restoration model based on the fixed step method.

Those skilled in the art should understand that the embodiments of the disclosure may provide methods, systems, or computer program products. Therefore, the disclosure may take the form of a complete hardware embodiment, a complete software embodiment, or an embodiment combining software and hardware. Moreover, the disclosure may take the form of computer program products implemented on one or more computer usable storage media (including but not limited to disk memory, compact disc read-only memory (CD-ROM), optical memory, etc.) containing computer usable program codes.

The disclosure is described with reference to the flowcharts and/or block diagrams of the methods, devices (systems), and computer program products according to the embodiments of the disclosure. It should be understood that each process and/or block in the flowcharts and/or block diagrams, and the combination of processes and/or blocks in the flowcharts and/or block diagrams can be realized by computer program instructions. These computer program instructions may be provided to the processor of a general-purpose computer, a special-purpose computer, an embedded processor, or other programmable data processing device to generate a machine, so that instructions executed by the processor of the computer or other programmable data processing device generate a device for realizing the functions specified in one or more processes of the flowcharts and/or one or more blocks of the block diagrams.

These computer program instructions can also be stored in a computer-readable memory that can guide a computer or other programmable data processing device to work in a specific way, so that the instructions stored in the computer-readable memory produce a manufacturing product including an instruction device that implements the functions specified in one or more flows of the flowcharts and/or one or more blocks of the block diagrams.

These computer program instructions can also be loaded onto a computer or other programmable data processing device, so that a series of operation steps are performed on the computer or other programmable device to produce computer implemented processing, so that the instructions executed on the computer or other programmable device provide steps for realizing the functions specified in one or more processes of the flowcharts and/or one or more blocks of the block diagrams.

The above contents are only to explain the technical idea of the disclosure and cannot limit the protection scope of the disclosure. Any changes made on the basis of the technical solutions according to the technical idea proposed by the disclosure fall within the protection scope of the claims of the disclosure.

What is claimed is:

1. A cooperative cyber-physical distribution system restoration method based on emergency mobile communications, comprising:
    S1, obtaining data of damaged and faulted lines of a distribution system, and determining locations of line switches and locations of working sites for mobile communication vehicles;
    S2, modeling an optimal path for the mobile communication vehicles based on the determined locations of the working sites for the mobile communication vehicles obtained by S1, and obtaining a routing model of the mobile communication vehicles; wherein the routing model of the mobile communication vehicles comprises: moving path constraints and moving time constraints of the mobile communication vehicles, and each of the mobile communication vehicles is represented by a communication agent (CA);
    S3, modeling repair crews dispatch to repair fault components based on the data obtained by S1, and obtaining a dispatch model of the repair crews; wherein the dispatch model of the repair crews comprises: travel path constraints and travel time constraints of the repair crews, and the repair crews are represented by a repair agent (RA);
    S4, modeling a distribution system load restoration based on a topology of the distribution system and the determined locations of the line switches obtained by S1, introducing a concept of an electric agent (EA) and establishing a relationship between a path optimization problem of the electric agent and a distribution system restoration problem through routing tables and arrival time vectors, and obtaining a restoration model of the distribution system; wherein the restoration model of the distribution system comprises: electrical path constraints and electrical time constraints of the distribution system, and an energy flow path of the distribution system is represented by the electric agent (EA);
    S5, determining dependency relationships among repair crew scheduling, mobile communication vehicle scheduling and distribution system sequence restoration, based on the moving path constraints in S2, the moving time constraints in S2, the travel path constraints in S3, the travel time constraints in S3, the electrical path constraints in S4 and the electrical time constraints in S4; wherein the dependency relationships comprise: interdependence constraints between the repair crew scheduling and the distribution system sequence restoration, and interdependence constraints between the mobile communication vehicle scheduling and the distribution system sequence restoration;
    S6, considering components and system operation constraints for the distribution system, regarding minimizing a total weighted unserved energy, a total repair time and a use time cost of the mobile communication vehicles as a goal, building a comprehensive optimization model of coordination between distribution system restoration and emergency mobile communication based on a variable time step method, according to the moving path constraints in S2, the moving time constraints in S2, the travel path constraints in S3, the travel time constraints in S3, the electrical path constraints in S4, the electrical time constraints in S4, the interdependence constraints between the repair crew scheduling and the distribution system sequence restoration in S5, and the interdependence constraints between the mobile communication vehicle scheduling and the distribution system sequence restoration in S5; and solving the comprehensive optimization model to obtain results of cooperative cyber-physical distribution system restoration; and
    S7, restoring communication paths and loads of the distribution system after disasters based on the results.

2. The method according to claim 1, wherein in S2, the moving path constraints in the routing model of the mobile communication vehicles are as follows:

$x_{ii}^C=1, \forall i \in D^C;$ $x_{ii}^C=0, \forall i \in W^C;$ $x_{ij}^C=0, \forall i \in D^C \cup W^C, j \in D^C, i \neq j;$ $x_{ij}^C+x_{ji}^C \leq 1, \forall i,j \in D^C \cup W^C;$ $\Sigma_{j=1,j\neq i}^{n^{CA}} x_{ij}^C \leq n_{cap,i}^C, \forall i \in D^C;$ $\Sigma_{j=1}^{n^{CA}} x_{ij}^C \leq \Sigma_{h=1}^{n^{CA}} x_{hi}^C \leq 1, \forall i \in W^C;$ where $x_{ii}^C$, $x_{ij}^C$, $x_{ji}^C$ and $x_{hi}^C$ respectively represent elements in a routing table of the mobile communication vehicles, $n^{CA}$ represents the number of the working sites for the mobile communication vehicles, $n_{cap,i}^C$ represents the number of the mobile communication vehicles owned by the working site i, $D^C$ represents a gathering center of the mobile communication vehicles, which is a starting point, and $W^C$ represents a set of the working sites for the mobile communication vehicles.

3. The method according to claim 1, wherein in S3, the travel path constraints in the dispatch model of the repair crews are as follows:

$x_{ii}^R = 1, \forall i \in D^R;$ $x_{ii}^R = 0, \forall i \in W^R;$ $x_{ij}^R = 0, \forall i \in D^R \cup W^R, j \in D^R, i \neq j;$ $x_{ij}^R + x_{ji}^R \leq 1, \forall i, j \in D^R \cup W^R;$ $\sum_{j=1, j \neq i}^{n^{RA}} x_{ij}^R \leq n_{cap,i}^R, \forall i \in D^R;$ $\sum_{j=1}^{n^{RA}} x_{ij}^R \leq \sum_{h=1}^{n^{RA}} x_{hi}^R \leq 1, \forall i \in W^R;$ where $x_{ii}^R$, $x_{ij}^R$, $x_{ji}^R$ and $x_{hi}^R$ respectively represent elements in a repair routing table, $n_{cap,i}^R$ represents the number of the repair crews owned by a depot i, $D^R$ represents a set of depots, $W^R$ represents a repair site set, and $n^{RA}$ represents the number of fault points and depots.

4. The method according to claim 1, wherein in S4, the electrical path constraints in the restoration model of the distribution system are as follows:

$x_{ii}^E = 1, \forall i \in g^E;$ $x_{ii}^E = 0, \forall i \in C^E \backslash g^E;$ $x_{ij}^E = 0, \forall i \in C^E, j \in g^E, i \neq j;$ $x_{ij}^E = x_{ji}^E = 0, \forall (i,j) \notin SW;$ $x_{ij}^E + x_{ji}^E \leq 1, \forall (i,j) \in SW;$ $\sum_{h=1}^{n^{EA}} x_{hi}^E \leq 1, \forall i \in C^E;$ $\sum_{j=1}^{n^{EA}} x_{ij}^E \leq n^{EA} \sum_{h=1}^{n^{EA}} x_{hi}^E, \forall i \in C^E;$ where $x_{ii}^E$, $x_{ij}^E$, and $x_{ji}^E$ respectively represent elements in an electrical routing table, $n^{EA}$ represents the number of node cells of the distribution system, $C^E$ represents a set of node cells, $g^E$ represents a set of node cells in which a black start generator or a substation is inside, SW represents a set of the line switches, and $x_{hi}^E$ represents an energy flow path from the node cells h to i.

5. The method according to claim 1, wherein in S5, the interdependent constraints between the mobile communication vehicle scheduling and the distribution system sequence restoration are as follows:

$x_{ij}^E = d_{ij}^{AO} + d_{ij}^{MO}, \forall (i,j) \in SW;$ $d_{ij}^{AO} \leq \sum_{h=1, h \neq k}^{CA} x_{hk}^C k \in W_{(i,j)}^C;$ $t_j^E \geq t_k^{Ca} - (2 - d_{ij}^{AO} - \sum_{h=1, h \neq k}^{CA} x_{hk}^C)M, \forall k \in W_{(i,j)}^C;$ $t_j^E \leq t_k^{Cd} - (2 - d_{ij}^{AO} - \sum_{h=1, h \neq k}^{CA} x_{hk}^C)M, \forall k \in W_{(i,j)}^C;$ $t_k^{Cd} \geq \max(t_i^E, f_j^R) + T_{(i,j)}^{AS} - (2 - d_{ij}^{AO} - \sum_{h=1, h \neq k}^{CA} x_{hk}^C)M,$
$\forall k \in W_{(i,j)}^C;$ $t_j^E \geq \max(t_i^E, f_j^R) + T_{(i,j)}^{AS} - (1 - d_{ij}^{AO})M;$ $\max(t_j^E, f_j^R) \leq RT_{(i,j)} + (1 - d_{ij}^{AO})M;$ where $x_{ij}^E$ represents a binary variable to indicate if branch (i, j) is energized, $d_{ij}^{AO}$ and $d_{ij}^{MO}$ are binary variables indicating if switch (i, j) is automatically/manually operated from i to j, $d_{ij}^{AO}$ is a binary variable, $x_{hk}^C$ represents an element in a routing table, $n^{CA}$ represents the number of the working sites for the mobile communication vehicles, $t_j^E$ represents time for a node cell j to be energized, $t_k^{Ca}$ and $t_k^{Cd}$ respectively represent time for the communication agent to arrive the working site k and leave the working site k, M represents a constant, $t_j^E$ represents time for a node cell i to be energized, $f_j^R$ represents time for the fault components in the node cell j to be repaired, $T_{(i,j)}^{AS}$ represents operation time of an automatic switch, $RT_{(i,j)}$ represents a residual time of a backup battery of a feeder terminal unit (FTU) on a line (i, j), SW represents a set of the line switches, $W_{(i,j)}^C$ represents a line set of a FTU corresponding to the working site, and $f_i^R$ represents time for the fault components in the node cell i to be repaired;

wherein the interdependent constraints between the repair crew scheduling and the distribution system sequence restoration are as follows:

$d_{ij}^{MO} + d_{ji}^{MO} = \sum_{h=1, h \neq k}^{n^{RA}} x_{hk}^R, \forall (i,j) \in SW, k = e^r(i,j);$ $\left. \begin{array}{l} d_{ij}^{MOe} + d_{ij}^{MOde} \geq 1 - (1 - d_{ij}^{MO})M \\ d_{ij}^{MOe} + d_{ij}^{MOde} \leq 1 + (1 - d_{ij}^{MO})M \end{array} \right\}, \forall (1,j) \in SW;$ $\frac{t_{e^r(i,j)}^R - t_i^E}{M} \leq d_{ij}^{MOe} \leq \frac{t_{e^r(i,j)}^R - t_i^E}{M} + 1, \forall (i,j) \in SW;$ $\left. \begin{array}{l} t_j^E \geq t_{e^r(i,j)}^R + T_{(i,j)}^{MS} - (2 - d_{ij}^{MO} - d_{ij}^{MOe})M \\ t_j^E \leq t_{e^r(i,j)}^R + T_{(i,j)}^{MS} + (2 - d_{ij}^{MO} - d_{ij}^{MOe})M \end{array} \right\}, \forall (i,j) \in \frac{SW}{F};$ $\left. \begin{array}{l} t_j^E \geq t_{e^r(i,j)}^R + T_{(i,j)}^{MS} + T_{(i,j)}^{RP} - (2 - d_{ij}^{MO} - d_{ij}^{MOe})M \\ t_j^E \leq t_{e^r(i,j)}^R + T_{(i,j)}^{MS} + T_{(i,j)}^{RP} + (2 - d_{ij}^{MO} - d_{ij}^{MOe})M \end{array} \right\}, \forall (i,j) \in SW \cap F;$ $\frac{t_i^E - (t_{e^r(i,j)}^R + T_{(i,j)}^{MS})}{M} \leq d_{ij}^{MOde} \leq \frac{t_i^E - (t_{e^r(i,j)}^R + T_{(i,j)}^{MS})}{M} + 1,$
$\forall (i,j) \in SW \backslash F;$ $\frac{t_i^E - (t_{e^r(i,j)}^R + T_{(i,j)}^{RP} + T_{(i,j)}^{MS})}{M} \leq d_{ij}^{MOde} \leq \frac{t_i^E - (t_{e^r(i,j)}^R + T_{(i,j)}^{RP} + T_{(i,j)}^{MS})}{M} + 1,$
$\forall (i,j) \in SW \cap F;$ $\left. \begin{array}{l} t_j^E \geq t_i^E - (2 - d_{ij}^{MO} - d_{ij}^{MOde})M \\ t_j^E \leq t_i^E + (2 - d_{ij}^{MO} - d_{ij}^{MOde})M \end{array} \right\}, \forall (i,j) \in SW;$ $\left. \begin{array}{l} t_j^E \geq t_{e^r(i,j)}^R + T_{(i,j)}^{RP} \\ t_j^E \geq t_{e^r(i,j)}^R + T_{(i,j)}^{RP} \end{array} \right\}, \forall (i,j) \in SW \cap F;$ $t_i^E \geq f_i^R, \forall i \in C^E;$ where $d_{ij}^{MOe}$ and $d_{ij}^{MOde}$ respectively represent the repair crews manually operating the line switch with electricity and without electricity; $x_{hk}^R$ represents the element in a repair routing table, $n^{RA}$ represents a sum of the number of fault points and depots, $d_{ji}^{MO}$ is a binary variable indicating if the switch (i, j) is manually operated, $e^r(i, j)$ represents an index conversion of the line switch (i, j) from the electric agent to the repair agent, $t_{e^r(i,j)}^R$ represents time for the repair crews to arrive the fault point, $t_i^E$ represents time for the node cell i to be energized, $T_{(i,j)}^{MS}$ represents operation time of a manual switch, $T_{(i,j)}^{RP}$ represents time for the repair crews to repair a faulted line (i, j), F represents a set of faulted line, and $C^E$ represents a set of node cells in the distribution system.

6. The method according to claim 1, wherein in S6, an objective function of the comprehensive optimization model is as follows:

$$\min Obj = \beta^E Obj^E + \beta^R Obj^R + \beta^C Obj^C;$$

$$Obj^E = \Sigma_{c \in C^E} w_c^E t_c^E \Sigma_{l \in L_c} \Sigma_{\varnothing \in \Phi} P_{l,\varnothing}^L;$$

$$Obj^R = w_1^R \Sigma_{i=1}^{n^{RA}} \Sigma_{j=1, j \neq i}^{n^{RA}} x_{ij}^R T_{ij}^R + w_2^R \Sigma_{i=1}^{n^{EA}} f_i^R;$$

$$Obj^C = w_1^C \Sigma_{i=1}^{n^{CA}} \Sigma_{j=1, j \neq i}^{n^{CA}} x_{ij}^C T_{ij}^C + w_2^C \Sigma_{i \in W} C(t_i^{Cd} - t_i^{Ca});$$

where $Obj^E$, $Obj^R$ and $Obj^C$ are three sub objective functions, which respectively represent the total weighted unserved energy, the total repair time, the use time cost of the mobile communication vehicles, $\beta^E$, $\beta^R$ and $\beta^C$ are coefficients in front of the three sub objective functions respectively, $w_c^E$ represents a weight value of a node cell c, $t_c^E$ represents time for the node cell c to be energized, $P_{l,\varnothing}^L$ represents a load at a node cell l, $L_c$ represents a set of loads in the node cell c, $\Phi = \{a, b, c\}$ represents power three-phase, $w_1^R$ and $w_2^R$ respectively represent a weight of the total travel time of all RAs and total repair completion time of all the node cells, $n^{RA}$ represents the number of fault points and depots, $x_{ij}^R$ represents an element in the repair routing table, $T_{ij}^R$ represents time for the repair crews to move between the two fault components, $n^{EA}$ represents the number of node cells of the distribution system, $f_i^R$ represents time for the fault components in the node cell i to be repaired, $w_1^C$ and $w_2^C$ respectively represent the weight of the total travel time of all CAs and the total duration of stay of CAs at all the working sites, $n^{CA}$ represents the number of the working sites of the mobile communication vehicles, $x_{ij}^C$ represents an element in a routing table for the mobile communication vehicles, $T_{ij}^C$ represents time for the mobile communication vehicles to move from the working sites i to j, $W^C$ represents a set of the working sites for the mobile communication vehicles, and $t_i^{Ca}$ and $t_i^{Cd}$ respectively represent time for the communication agent to arrive the working site i and leave the working site i.

7. A cooperative cyber-physical distribution system restoration system based on emergency mobile communications, comprising: a processor and a memory; wherein the memory is stored with at least one instruction, and the processor is configured to, when the at least one instruction is loaded and executed by the processor, implement the method according to claim 1.

* * * * *